Dec. 11, 1928.
S. C. RYDER
1,695,029
APPARATUS FOR AUTOMATICALLY DISPLAYING LANTERN
SLIDES BEARING ADVERTISEMENTS OR OTHER MATTER
Filed July 1, 1927       5 Sheets-Sheet 5
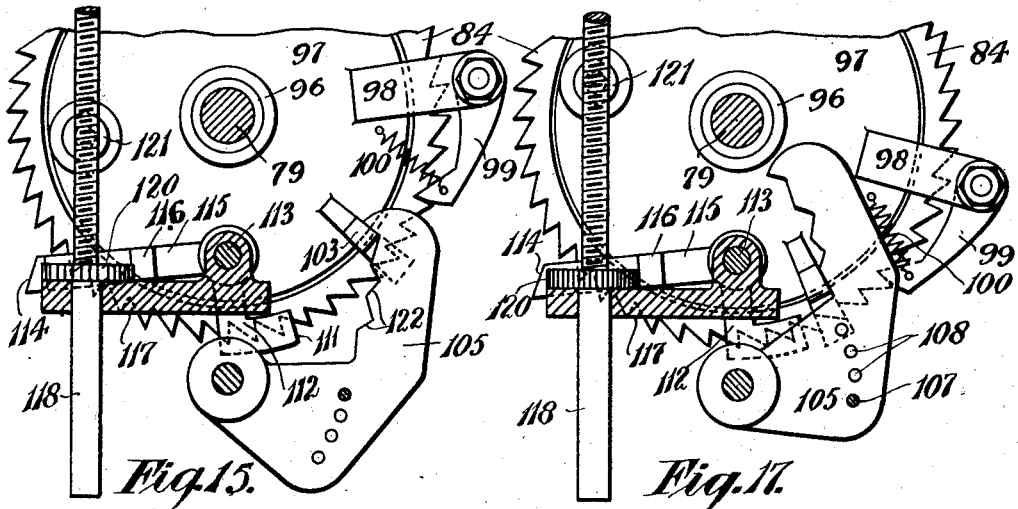
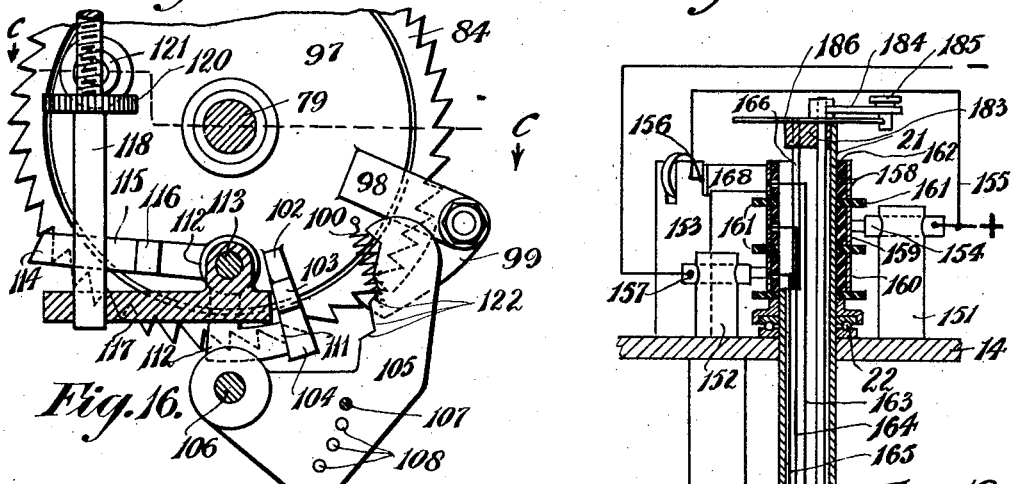
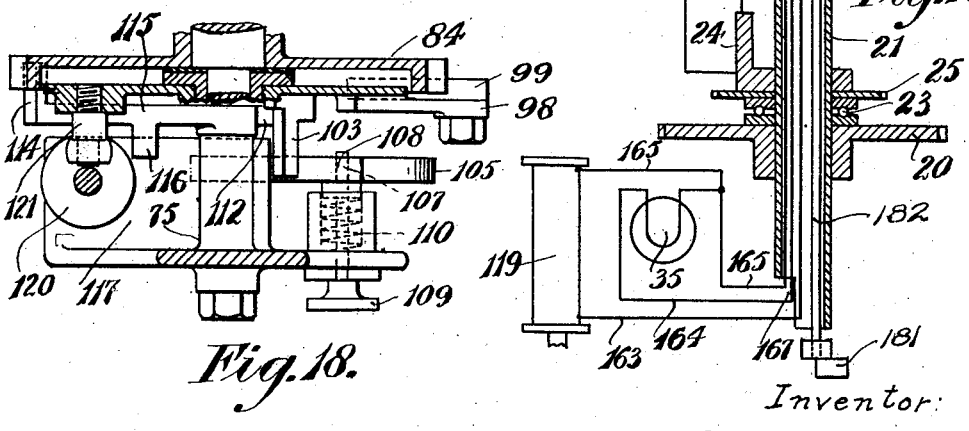
Inventor:
S. C. Ryder
By Emil Bonnelyche
Attorney Patented Dec. 11, 1928.

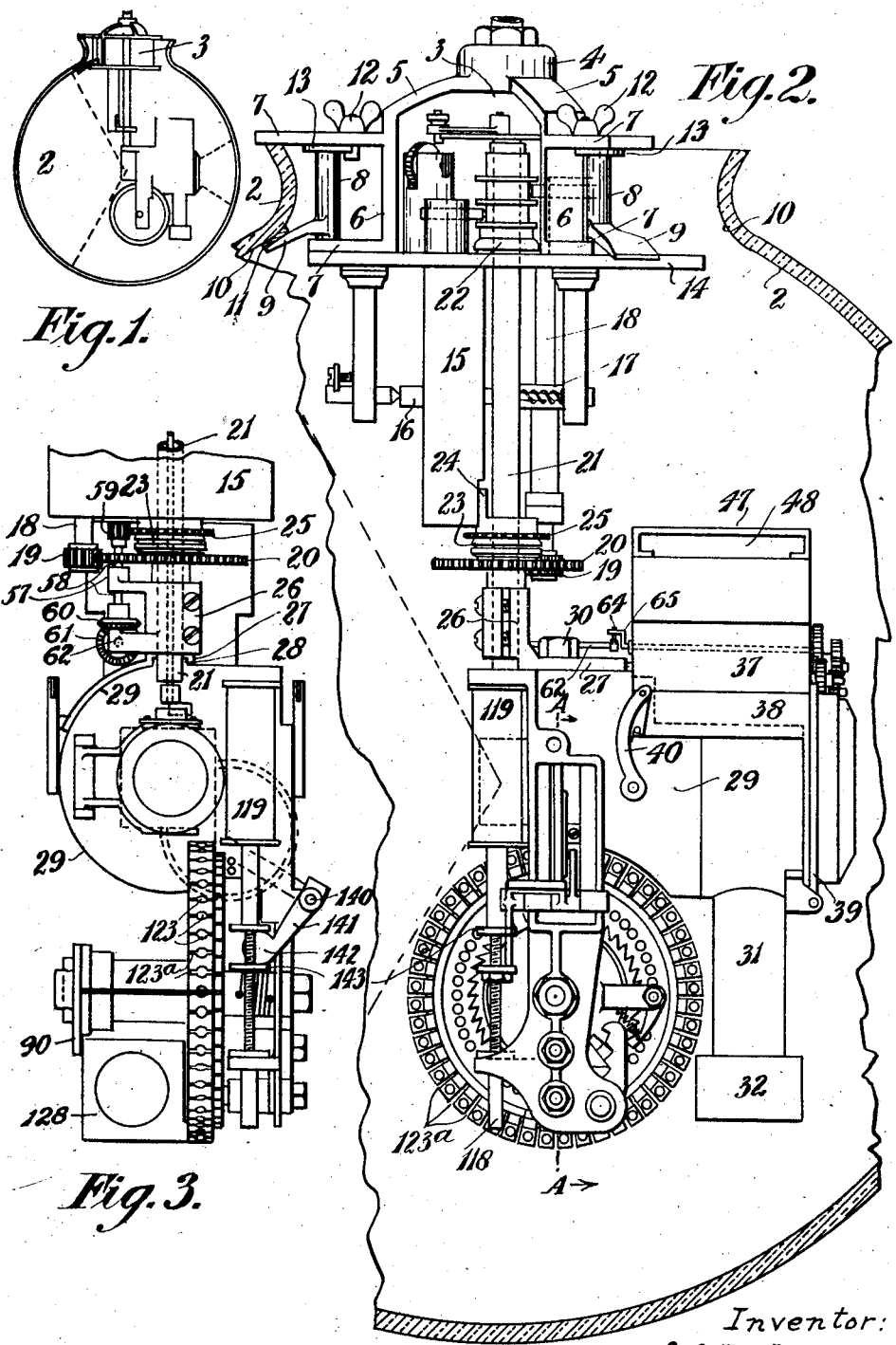

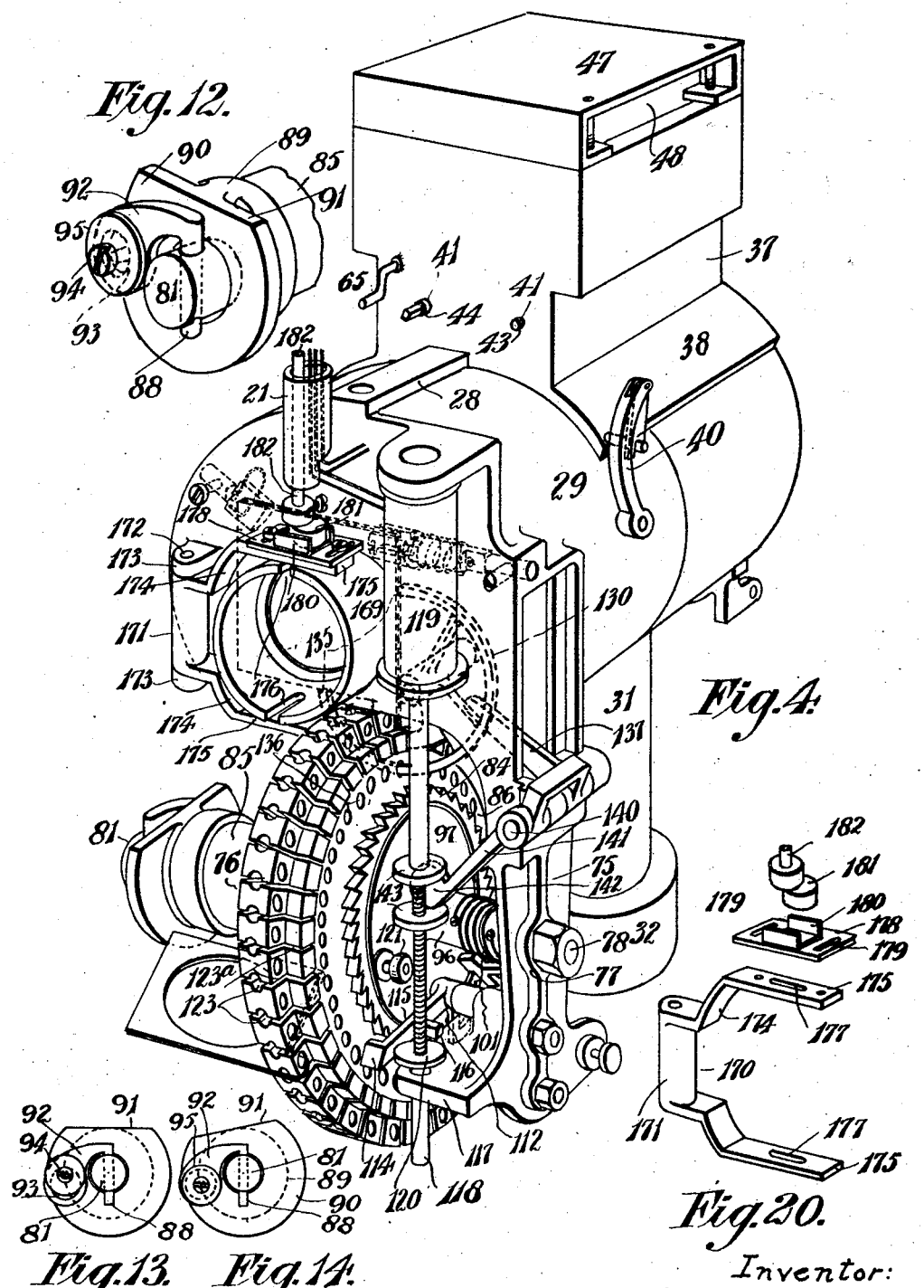

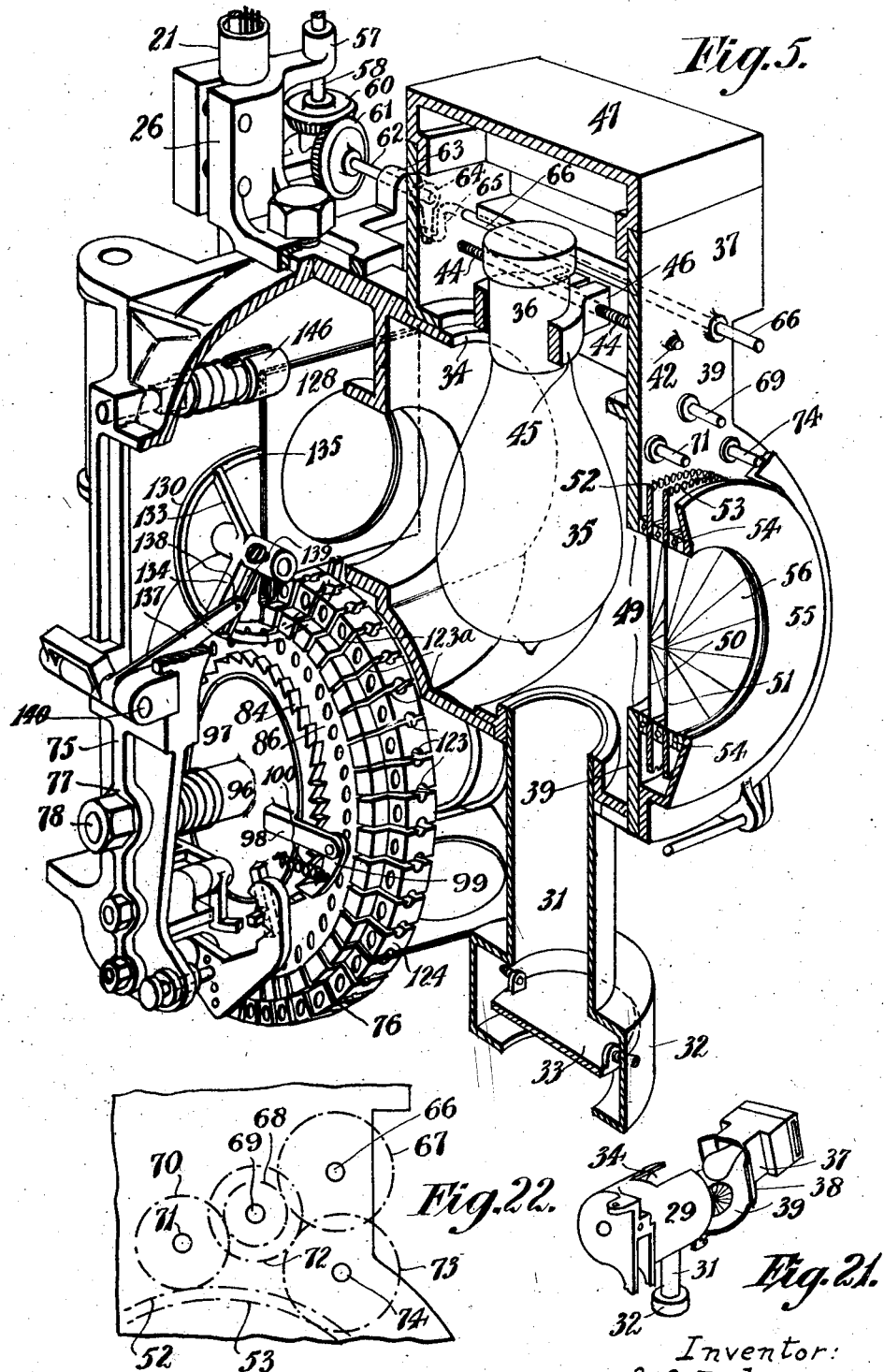

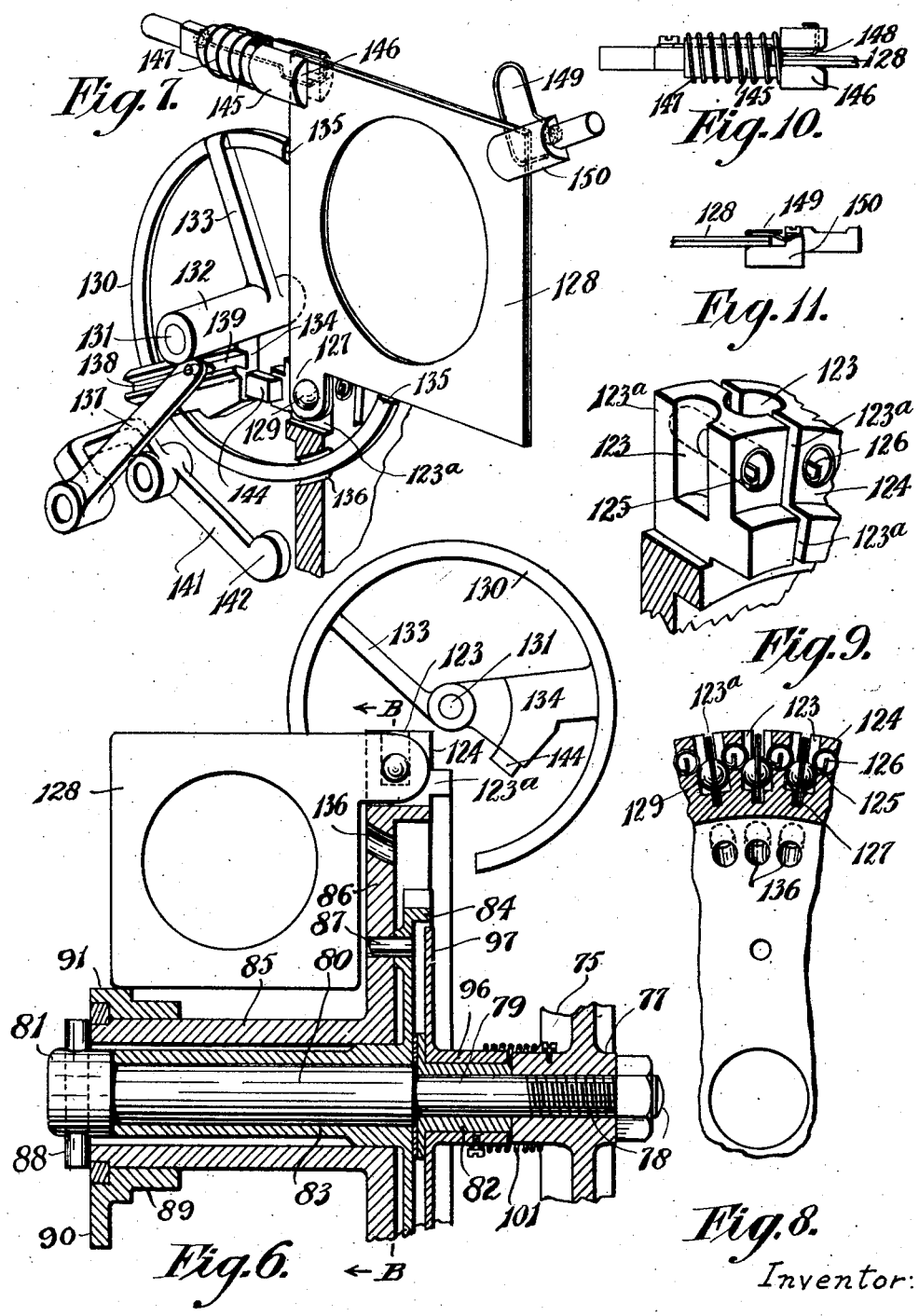

1,695,029

UNITED STATES PATENT OFFICE.

SAMUEL CHARLES RYDER, OF SYDNEY, AUSTRALIA.

APPARATUS FOR AUTOMATICALLY DISPLAYING LANTERN SLIDES BEARING ADVERTISEMENTS OR OTHER MATTER.

Application filed July 1, 1927, Serial No. 202,951, and in Australia October 12, 1926.

This invention relates to an improved apparatus for automatically displaying lantern slides bearing advertisements or other matter.

The invention provides an apparatus wherein the slide projecting mechanism, the slide magazine and the various working parts are rotatably mounted within a translucent globe or bowl, and the slides are displayed successively upon the surface of said globe. Improved means are provided for mounting the slides in the magazine, and for moving the slides successively into display position, while rotating color screens are used to produce kaleidoscopic effects on the translucent globe to attract and hold public attention to the apparatus.

In the accompanying drawings:—

Figure 1 is a small diagrammatic view of the complete apparatus.

Figure 2 is a view in side elevation of the internal mechanism of the apparatus.

Figure 3 is a view in front elevation of the lower portion of the mechanism shown in Figure 2.

Figure 4 is a perspective view of the picture projecting mechanism.

Figure 5 is a sectional perspective view of the mechanism shown in Figure 4.

Figure 6 is an enlarged sectional view on line A—A of Figure 2, showing a portion of the slide magazine and its associated operating mechanism.

Figure 7 is a detail perspective view of one of the slide carriers of the magazine and of the mechanism for elevating said slide carriers to display position.

Figure 8 is a sectional view taken on line B—B of Figure 6 illustrating ball and spring grips employed for detachably holding the slide carriers in the magazine.

Figure 9 is a detail perspective view of the spring grips shown in Figure 8.

Figure 10 is a detail view of a combined buffer and spring grip for holding the slide carriers at display position.

Figure 11 is a detail view of another spring grip adapted to function conjunctively with the device shown in Figure 10 in holding the slide carriers in display position.

Figure 12 is a perspective view of a flanged bush fitted on the magazine to support the slide carriers.

Figures 13 and 14 are diagrammatic views showing different positions of the flanged bush illustrated in Figure 12.

Figure 15 is a detail view of ratchet mechanism for rotating the slide magazine.

Figure 16 is a view similar to Figure 15 but showing the position of the ratchet mechanism after the slide magazine has been partially rotated.

Figure 17 is a view of the ratchet mechanism when set to rotate the magazine so as to display every slide in the magazine when the latter is filled to its utmost capacity.

Figure 18 is a sectional plan view on line C—C of Figure 16.

Figure 19 is a diagrammatic view showing the main shaft of the apparatus and the electrical wiring arrangements.

Figure 20 is a perspective view showing in detail the parts of the lens adjusting mechanism.

Figure 21 is a perspective view of the main casing of the apparatus showing how one of the parts can be hingedly swung rearwardly to permit convenient access to the electric lamp and its associated fittings.

Figure 22 is a diagrammatic view of the gearing for rotating the color screens of the projecting apparatus to produce kaleidoscopic effects.

The improved apparatus includes a bowl or globe 2 formed of opal glass or like translucent material and adapted to rotatably accommodate the slide projecting mechanism and other parts of the apparatus. The translucent bowl or globe 2 is suitably suspended from a ceiling or elevated bracket by means of a tube, chain or like member connected at its lower end to a hanger 3. Said hanger comprises a boss 4 constructed with three arms 5 which are equally spaced around said boss and are formed with vertical members 6. Each of said vertical members has two horizontal lugs 7 between which a bush or sleeve 8 is rotatably mounted upon a vertical pin fixedly held between said horizontal lugs. Each bush 8 has at its lower end a supporting flange 9 which adjustably engages the interior neck portion 10 of the translucent globe 2 and thereby supports said globe—see Figure 2. Interposed between each flange 9 and the neck of the globe is a pad 11 of felt or like soft material to prevent damage to the globe by the metallic contact of said flange. The flanges 9 are locked in position against the globe 2 by thumb screws 12 engaging narrow flanges 13 formed integrally on the bushes 8.

By releasing the thumb screws 12 and partially rotating the flanges 9 until they are disengaged from the neck of the translucent globe, said globe can be conveniently removed from its hanger.

Secured to the lower horizontal lugs 7 of the hanger 3 is a metallic suspension plate 14 from which the various driving parts and electrical contacts of the apparatus are supported. Depending from said suspension plate 14 is a power unit 15 preferably consisting of an electric motor of the slow-moving type. Motion is imparted by the power unit 15 to a horizontal shaft 16 and thence by worm gearing 17 to a vertical shaft 18. Said vertical shaft 18 carries at its lower end a pinion 19 which meshes with a large gear wheel 20 rigidly mounted on the lower end of a main shaft 21 of tubular construction.

The upper end of the tubular main shaft 21 is supported by a ball thrust bearing 22 mounted on the suspension plate 14, while the intermediate portion of said main shaft is supported by a second ball thrust bearing 23 secured by a bracket 24 to the frame of the power unit 15. Rigidly connected to the underside of the bracket 24 is a stationary gear wheel 25 which is concentrically arranged in relation to the tubular shaft 21.

Arranged below the large gear wheel 20 and clamped rigidly to the tubular main shaft 21 is a bracket 26 having a horizontal arm 27 which engages a fitting rib 28 formed integrally with the main casing 29 of the slide projecting mechanism. The horizontal arm 27 is rigidly bolted to said main casing 29 by a set screw 30 so that the slide projecting mechanism is rotated within the globe 2 by the said shaft 21.

The main casing 29 of the slide projecting mechanism is provided at its lower ends with a tubular vent 31 having an enlarged lower end 32 through which a continuous draught of cool air is induced into the slide projector to prevent over-heating. Light is prevented from escaping through the vent 31 by means of a baffle plate 33 pivotally fitted within the enlarged lower end 32.

The main casing 29 is cut away at its upper end to form an opening 34 to permit convenient access to a powerful electric lamp 35 employed for projecting the slides. Said lamp 35 is supported in a socket 36 of ordinary construction fitted within a hinged casing 37 which is adapted to fit over and cover the opening 34—see Figures 5 and 21. The hinged casing 37 is substantially rectangular in shape and it has upon its lower side edges curved flanges 38 which conform to the curvature of the main casing 29 and are adapted to fit snugly against the sides of said main casing when the part 37 is closed to cover the opening 34.

The rear wall 39 of the hinged casing 37 is of circular configuration and extends downwardly to thus cover the end opening in the main casing 29 when the parts are assembled in correct order. The hinged casing 37 is held in closed position over the opening 34 in the main casing by means of a catch device 40.

Supported in bearings 41 and 42 on the hinged casing 37 are two parallel horizontal rods 43 and 44, one of which 43 has a smooth surface while the other 44 is screw-threaded. Supported by these rods is a bracket 45 carrying the lamp socket 36. Said bracket has two pairs of arms 46 formed with holes through which the rods 43 and 44 are passed, the holes for the screw-threaded rod 44 being tapped to receive it; only the rod 44 appears in Figure 5 because of the plane in which the section is taken, but it will be readily understood that the bracket is mounted on both rods, and in like manner only the arms 46 for the said rod 44 appear. By rotating the screw-threaded rod 44 by means of a detachable turning key the bracket 45 is caused to slidably move along the rod 43, thereby adjusting the position of the lamp 35 for focusing purposes.

Secured to the top of the hinged casing 37 is a baffle plate 47 having side openings 48 through which the hot air from the interior of the slide projecting apparatus may escape.

The rear wall 39 of the hinged casing 37 has a central aperture 49 through which light from the lamp 35 passes to color screens 50 and 51 rigidly attached to large gear wheels 52 and 53 respectively. Said gear wheels are mounted between ball bearings 54 supported by the rear wall 39 of the hinged casing 37 and by a flanged collar member 55. The flanged collar 55 has a central aperture 56 through which the colored light rays from the rotated color screens 50 and 51 are projected upon the surface of the translucent globe 2 at the side diametrically opposite from the side upon which the lantern slides are projected.

Formed on the bracket 26 rigidly clamped to the tubular main shaft 21 are two bosses 57 supporting a vertical shaft 58. This shaft passes through a clearance hole in the web of the large gear wheel 20 and it carries at its upper end a pinion 59—see Figure 3—meshing with the stationary gear wheel 25. The pinion 59 is rotated by being moved around the stationary gear wheel 25 in a sun and planet gear motion.

Movement of said pinion 59 rotates the shaft 58 which, in turn, rotates a bevel wheel 60 meshing with a second bevel wheel 61. The latter bevel wheel is mounted on a short horizontal shaft 62 supported in bearings 63 formed on the main casing 29. Fitted on the end of the said short horizontal shaft 62 is a lever 64 adapted to engage and rotate a crank 65 formed integrally on a horizontal spindle 66 mounted in bearings formed on hinged casing 37. The end of said spindle 66 passes through the rear end of the casing 37 and is fitted with a gear wheel 67—see Figure 22. Said gear wheel 67 meshes with a smaller gear wheel 68 mounted on a stub shaft 69. A gear wheel 70 mounted upon a stub shaft 71 also meshes with said small gear wheel 68 and in turn drives the large gear wheel 52 carried by the color screen 50. Rigidly attached to the small gear wheel 68 is a large gear wheel 72 meshing with a gear wheel 73 mounted upon a stub shaft 74. This gear wheel 73 meshes with and drives the large gear wheel 53 carried by the color screen 51.

By the means herein described the two color screens 50 and 51 are rotated in the same direction at different speeds from the tubular main shaft 21, thereby producing attractive kaleidoscopic effects. The lever 64 and crank connection 65 enable the color screen drive to be conveniently disconnected when the hinged casing 37 is swung rearwardly.

Formed integrally with and extending downwardly from the main casing 29 is a webbed bracket 75 which supports the slide magazine 76, and the mechanism for imparting intermittent rotary motion to said magazine and for moving the slides into display position. Rigidly bolted to a boss 77 formed on the bracket 75 is a horizontal rod 78 of circular section having three stepped portions 79, 80 and 81 of different diameters. The portion 79 is screw-threaded and is fitted with a flanged bush 82 which bears against the shoulder formed by the portion 80 or against a washer fitted thereagainst. The bush 82, the shoulder of the portion 80, and the boss 77 are rigidly clamped together by a nut screwed onto the end of the portion 79.

Rotatably mounted upon the portion 80 of the rod 78 is a long boss 83 formed with an integral ratchet wheel 84. The boss 83 is restrained against endwise movement on the rod 78 by the flanged bush 82 and by the shoulder of the rod portion 81. Mounted on the boss 83 is a cylindrical member 85 which is constructed integrally with a disc 86 forming the end wall of the slide magazine. The magazine disc 86 is connected to the ratchet wheel 84 by a pin 87 whereby it is rotated by the movement of said ratchet wheel. The magazine disc and its boss are restrained against endwise movement in one direction by a pin 88 passed through the rod portion 81, and in the opposite direction by abutment against the ratchet wheel 84.

Freely fitted over the cylindrical member 85 is a bush 89 formed with a flange 90 having a gap or cutaway portion 91. The bush 89 is connected to the rod 78 by a member 92 formed integrally with the pin 88. Said member 92 has a large hole 93 (see Figure 13 of the drawings) through which is passed a small screw 94 fitting into the flange 90 of the bush 89. The hole 93 is protected by a washer 95 and the screw 94 is passed through a central hole in said washer.

This construction allows the bush 89 to be partially rotated with the cylindrical member 85 of the magazine disc by frictional contact therewith in the manner later described, but this partial rotation of the bush is limited by the difference in diameter between the screw 94 and the hole 93.

Mounted concentrically upon the flanged bush 82 is a boss 96 formed integrally with a carrier disc 97 supporting pawl mechanism for intermittently rotating the slide magazine through the ratchet wheel 84. The carrier disc 97 has an arm 98 to which is pivoted a ratchet pawl 99 held in contact with the teeth of the ratchet wheel 84 by a sensitive spring 100. The carrier disc 97, the arm 98 and the ratchet pawl 99 are returned after each thrust of the pawl by a helical torsion spring 101, one end of which is connected to the boss 77 and the other end to the boss 96—see Figures 4 and 6.

The carrier disc 97 has formed integrally with it an arm 102 having two projections 103 and 104. The projection 103 (see Figures 15 and 17) engages an adjustable gauge plate 105 adapted to be set to control the extent of rotation of the ratchet wheel during each thrust of the pawl 99.

The gauge plate 105 is pivoted at 106 to the webbed bracket 75 and is held in adjusted position by a spring catch-pin 107 engaging a selected one of a series of holes 108. The catch-pin 107 is conveniently withdrawn from its hole 108 during the setting of the gauge plate by pulling a knob 109 outwards against the pressure of a spring 110.

The projection 104 of the arm 102 is adapted to strike the end 111 of a bellcrank lever 112 at the completion of each stroke of the ratchet pawl 99. This movement rocks said bellcrank lever on its pivot pin 113, thereby causing a projection 114 formed on the horizontal arm 115 of said lever to rise and engage a tooth of the ratchet wheel 84 thereby locking said ratchet wheel against further movement until the next stroke of the pawl—see Figure 16 of the drawings. The said horizontal arm 115 of the bellcrank lever has a short projection 116 adapted to rest upon a horizontal web 117 on the bracket 75 to support the weight of said bellcrank lever. Movement is imparted to the carrier disc 97, the arm 98 and the ratchet pawl 99 by the upward movement of a vertical rod 118 which is slidably passed through a guiding hole in the horizontal web 117 of the bracket 75. The upper end of the vertical rod 118 is rigidly attached to the movable core of a solenoid 119, while the lower end of said rod is screw-threaded to receive a disc 120 adapted to contact with a roller 121 mounted on the carrier disc 97. The moment of contact of the disc 120 with the roller 121 is conveniently regulatable by adjusting said disc on the screw-threaded portion of the rod 118.

When the solenoid 119 is energized, the disc 120 contacts with the roller 121 and partially rotates the carrier disc 97, thereby actuating the ratchet wheel 84 through the ratchet pawl 99. The ratchet wheel 84 in turn partially rotates the magazine disc 86 by means of the pin 87. Upon de-energization of the solenoid 119 the core and the vertical rod 118 drop by gravity to their passive positions—see Figures 4 and 15. The rapidity of the descent of the vertical rod 118 may, if desired, be augmented by the provision of a spring or weight.

The ratchet pawl 99, the carrier disc 97 and the roller 121 are returned to their inoperative positions by the influence of the torsion spring 101. Said carrier disc and its appurtenances, upon return to inoperative position, are checked against excessive movement by contact of the projection 103 with one of a series of flats 122 formed on the edge of the gauge plate 105. The setting of the gauge plate by means of the adjustment holes 108 brings a selected one of the flats 122 into position in the path of the projection 103, thereby limiting the return movement of the carrier disc 97. The distance of the roller 121 above the disc 120 is thus varied, thereby regulating the amount of movement imparted to the carrier disc by the upward movement of said disc 120. Thus it will be seen that by adjusting the gauge plate 105 the amount of partial rotary movement imparted to the slide magazine at each action can be regulated, as desired, to suit the spacing of the slides in the magazine.

The slide magazine disc 86 is constructed with a series of spaced holes 123 and radial slots 123ª in its periphery. On the face of the magazine disc 86 is an annular rib 124 through which the radial slots 123ª pass. Formed centrally between the radial slots 123ª are horizontal holes 125 accommodating rolled plate spring 126. The horizontal holes 125 communicate with the holes 123, as shown in Figure 8, so that said rolled springs 126 extend slightly into the holes 123. Each radial slot 123ª of the magazine is adapted to receive the lug 127 of a carrier 128 supporting a display slide bearing advertisements or other matter for display. The lug 127 of each slide carrier has a ball 129 which is forced into the hole 123 and sprung past the rolled plate springs 126. Each slide carrier is thus firmly held between the springs 126 yet is freely pivotal upon the ball 129, while, furthermore, it is conveniently detachable from the magazine for replacement when desired by a carrier bearing a different slide.

All of the slide carriers 128 excepting those at or close to the display position are held lightly at one corner by the inner face of the flange 90, but this hold on the said slide carriers is not sufficiently strong to interfere with rotary movement of the slide magazine.

The slide carriers are raised into vertical display position in focus with the projecting lenses by an arcuate bar 130 pivoted on a horizontal shaft 131 which is mounted in bosses formed on the internal walls of the main casing 29. This arcuate bar is attached to its boss 132 by two radial arms 133 and 134, and its ends 135 are adapted to alternately contact with and operate the slide carriers 128 in succession. Holes 136 are formed in the magazine disc 86 beneath the radial slots 123ª to enable the arcuate bar 130 to engage the slide carriers.

The arcuate bar 130 is oscillated on its shaft 131 by a bellcrank lever 137 having a pin 138 engaging a slot 139 formed in the radial arm 134, see Figures 5 and 7. The bellcrank lever 137 is pivoted on a rod 140, and its arm 141 has a rounded end 142 adapted to lie between and in frictional engagement with two circular nuts 143 adjustably screwed onto the vertical rod 118.

Extending from the radial arm 134 is a knife-edged centering piece 144 adapted to enter the radial slots 123ª in the annular rib 124 simultaneously with the raising of the slide carriers to display position. The function of this centering piece is to rigidly lock the slide magazine, during the display of a slide, against any slight movement which may be caused by extraneous vibrations or by inaccuracies in the operation of the other parts.

When the solenoid 119 is energized the rod 118 with its circular nuts 143 is raised, causing the bellcrank lever 137 to be rocked on its rod 140 thereby actuating the arcuate bar 130 through the pin 138 and slot 139. Said arcuate bar is thus moved to the position shown in Figure 6, and in this position the slide magazine is free to be rotated by the ratchet mechanism to bring a slide carrier into position.

Upon the de-energization of the solenoid 119 the rod 118 falls by gravity, thereby actuating the bellcrank lever 137 which in turn oscillates the arcuate bar 130, causing it to pass through the hole 136 in disc 86 and contact with the edge of the slide carrier, thereby raising the latter to the display position shown in Figure 7.

The momentum of the raised slide carrier is absorbed by a buffer 145 consisting of a bifurcated block 146 and a coiled spring 147. The edge of the slide carrier engages the bifurcated block 146 and is gripped by a light spring 148. The opposite corner of the slide carrier is also gripped between a spring 149 and a block 150.

After the display of a slide the arcuate bar engages the upper edge of the slide carrier and pivotally returns it to the magazine, following which the magazine is rotated to bring another slide carrier into position for display.

The flange 90 of the bush 89, see Figure 3, functions to prevent the slide carriers from pivotally moving out of the magazine by gravity when said carriers are passing beneath the axis of the magazine. The cutaway portion 91 at the top of the flange 90 allows the slide carriers to be pivotally raised out of the magazine when at display position. The mounting of the flange 90 enables it to rotate with the cylindrical member 85 of the magazine disc 86, but said movement is limited by the difference in diameter between the hole 93 and the screw 94. The purpose of this limited movement is to reduce the frictional resistance of the slide carriers against the flange 90 when the magazine is being rotated to change the slides. Instead of all of the slide carriers positioned beneath the horizontal centre line of the magazine having to scrape against the inner face of the flange 90 (as would be the case if the said flange were rigid) the bush 89 is partially rotated with the advancing movement of the slide carriers, as shown in Figure 14, and is afterwards returned to prior position by the vibration caused by the blow struck by the slide carrier when falling from display position into the magazine. Thus the cut-away portion 91 of the flange 90 is slightly inclined from the horizontal when the slide carrier is in display position, but afterwards it assumes the horizontal position shown in Figure 13.

The electrical controls of the apparatus are illustrated diagrammatically in Figure 19 and comprise three insulating blocks 151, 152, and 153 mounted on the suspension plate 14 and supporting electrical contacts. The main positive lead is connected to a frictional contact brush 154 held by the block 151. A subsidiary positive lead connection 155 is connected to an adjustable contact piece 156 mounted on the block 153. The negative lead 165 is connected to a frictional contact brush 157 mounted on the block 152.

Mounted upon the tubular main shaft 21 are three metallic contact rings 158, 159, and 160 insulated from each other by washers 161 and from the shaft by bushes 162. Connected to the said contact rings are leads 163, 164, and 165 passing through a slot 166 into the tubular shaft 21. These leads extend down through the whole length of said tubular shaft and pass out through a gap or slot 167 at the lower end. The positive lead 164 connects to the electric lamp 35 and thence to negative lead 165. The positive lead 163 connects with the solenoid 119 and then with the lamp return lead 165, thus making a common return wire from both the solenoid and lamp.

Rigidly connected to the uppermost contact ring 158 is a wiper brush 168 of pliable brass or similar material adapted to make contact with the adjustable contact piece 156 on the block 153 once in every revolution of the tubular shaft 21. During the period of such contact current is allowed to flow via the lead 163 to the solenoid. As the tubular shaft is rotating continuously, a constant and steady supply of electric current flows to the projecting lamp 35 through the frictional brushes 154 and 157. The lenses of the slide projector are housed in a tubular casing 169 on the main casing 29 and are actuated by a pivoted bifurcated lever 170. Said lever comprises a vertical boss 171 pivoted on a pin 172 retained between lugs 173. Extending from the boss 171 are two arms 174 having horizontal members 175 adapted to swing clear of the tubular casing housing the lenses. The tubular casing 169 has longitudinal guide slots 176 through which two pin projections from the lens frame (not shown in the drawings) pass and engage slots 177 in the arms of the bifurcated lever.

Secured upon the upper arm of the lever 170 is a plate 178 having slots 179 whereby it can be transversely adjusted relative to said arm. A channel piece 180 is rigidly secured to the plate 178 and it accommodates a cam 181 rigidly mounted on a rod 182 which passes upwardly through the tubular shaft 21 and is rotatably held in a bearing formed in a top piece 183 fitted over said tubular shaft (see Figure 19). The upper end of the rod 182 has a hand-lever 184 fitted with clamping screw 185 adapted to engage and lock against a disc 186.

After releasing the screw 185, the hand-lever 184 can be rotated, thereby actuating the cam 181 which in turn moves the channel piece 180 forwards or backwards to swing the bifurcated lever 170. The lenses are thereby adjusted to the requisite focus by moving them either forwardly or backwardly within the tubular casing 169, the pin projections of the lens frame moving within the guide slots 176.

The operation of the apparatus is as follows:

The motor 15 imparts continuous motion to the tubular main shaft 21 through the worm gearing 17, the shaft 18 and the toothed gearing 19, 20. Said tubular shaft, through the medium of the bracket 26, rotates the picture projecting apparatus and its appurtenances continuously within the opal globe 2. Continuous motion is imparted to the color screens 50 and 51, causing them to rotate at different speeds and thus producing varied kaleidoscopic effects upon the surface of the globe.

Once in every revolution of the tubular shaft 21, the wiper brush 168 contacts with the contact piece 156 and thereby intermittently energizes the solenoid 119 to actuate the vertical rod 118. This movement of the rod 118 actuates the arcuate bar 130 and the slide-changing mechanism in the manner previously described.

What I do claim is:—

1. An improved lantern slide display apparatus comprising a translucent globe, a power unit mounted within said globe, a slide projector enclosed within said globe and rotated therein by the power unit to movably display the slides upon the globe, a slide magazine associated with said projector, means for intermittently actuating said magazine, and means for moving the individual slides in succession from and relatively to the magazine into the projector for display.

2. An improved lantern slide display apparatus as claimed in claim 1 and wherein the slide projector carries rotating color screens at its rear end to display kaleidoscopic effects upon the translucent globe simultaneously with the projection of the slides.

3. An improved lantern slide display apparatus comprising a translucent globe, a power unit mounted within said globe, a slide projector enclosed within said globe and rotated therein by the power unit to movably display the slides upon the globe, a slide magazine associated with said slide projector, ratchet mechanism for rotating said magazine to advance the slides in succession to display position, an electro-magnetic device actuating said ratchet mechanism, means for intermittently supplying current to said electro-magnetic device, and means for moving the slides in succession from the magazine into the projector for display.

4. An improved lantern slide display apparatus as claimed in claim 3, and wherein the slide magazine comprises a rotatably mounted cylindrical member having a disc whereon slide carriers are pivotally mounted.

5. An improved lantern slide display apparatus as claimed in claim 3, and wherein the slide magazine comprises a rotatable member driven by the ratchet mechanism, slide carriers pivotally connected to said rotatable member, a flanged bush engaging the edges of said slide carriers to hold them within the magazine, and means permitting limited rotary movement of said bush with the intermittent advancing movement of the slides to reduce the friction of the slides.

6. An improved lantern slide display apparatus as claimed in claim 3, and wherein the ratchet drive mechanism for the magazine comprises a ratchet wheel connected to the magazine, a carrier disc, a pawl pivoted on said carrier disc and engaging said ratchet wheel, a vertical rod actuated by a solenoid, and a member carried by said rod and adapted to actuate said carrier disc.

7. In apparatus for displaying lantern slides, a slide projector mounted within a translucent globe, means for rotating said slide projector to movably display the slides upon the globe, a slide magazine carried from said projector, slide carriers pivotally mounted in said magazine, means for intermittently rotating said magazine to advance the slides and means for pivotally elevating said slides successively into the projector.

8. In apparatus for displaying lantern slides, as claimed in claim 7, the construction wherein the slide magazine has radial slots and the slide carriers have lugs supporting pivot balls which are sprung into said slots between springs fitted therein.

9. In apparatus for displaying lantern slides, a slide projector mounted within a translucent globe, means for rotating said slide projector to movably display the slides upon the globe, a slide magazine carried from said projector, slide carriers pivotally mounted in said magazine, means for intermittently rotating said magazine to advance the slides, an arcuate bar adapted to pass through holes in the magazine and pivotally elevate the slide holders to display position, an electro-magnetic device adapted to be intermittently energized, and means for actuating said arcuate bar from said electro-magnetic device.

10. In apparatus for displaying lantern slides, a slide projector mounted within a translucent globe, means for rotating said slide projector to movably display the slides upon the globe, a slide magazine carried from said projector, a ratchet wheel connected to the magazine, a carrier disc having a pawl engaging said ratchet wheel, an electro-magnetic device adapted to be energized intermittently, means for actuating said carrier disc from said electro-magnetic device, an adjustable gauge plate, and a projection on said carrier disc to engage said adjustable gauge whereby the stroke of the pawl may be regulated to control the movement of the magazine.

11. In apparatus for displaying lantern slides, a translucent globe, a power unit, a slide projector enclosed within said globe and rotated therein by the power unit to movably display the slides upon the side of the globe, a slide magazine carried from said slide projector, slide carriers pivoted in said magazine, an electro-magnetic device, means for intermittently energizing said electro-magnetic device, means for intermittently rotating the slide magazine from said electro-magnetic device to advance the slide carriers, an arcuate bar adapted to pivotally elevate the slide carriers to display position, and means for actuating said arcuate bar from said electro-magnetic device.

12. In apparatus for displaying lantern slides, the combination of a translucent globe, a rotatable slide projector within said globe, a slide magazine carried from the slide projector, slide carriers pivotally mounted in said magazine, and means for pivotally elevating said slide carriers from the magazine to display position within the slide projector.

13. In apparatus for displaying lantern slides, the combination of a translucent globe, a power unit in said globe, a vertical shaft rotated by said power unit, a slide projector carried from said shaft, a slide magazine rotatably mounted at the lower end of said slide projector, slide carriers pivotally mounted in said magazine, and an electro-magnetic device for imparting intermittent rotary movement to said magazine and for pivotally moving the slide carriers to display position in the projector.

14. A lantern slide display apparatus comprising a stationary translucent globe, a power unit mounted within the globe, a slide projector enclosed within said globe and rotated therein by the power unit to movably display the slides upon and around the wall of the globe during its rotation, a slide magazine associated with said projector, means for intermittently moving said magazine, and means for moving the individual slides in succession from and relatively to the magazine into the projector for display.

15. A lantern slide display apparatus comprising a stationary translucent globe, a power unit mounted within the globe, a slide projector enclosed within said globe and rotated therein by the power unit to movably display the slides upon and around the wall of the globe during its rotation, a slide magazine associated with said projector, means for intermittently moving said magazine, means for moving the individual slides in succession from and relatively to the magazine into the projector for display, and color screens carried by the projector at its rear end to display kaleidoscopic effects upon the globe wall simultaneously with the projection of the slides.

In testimony whereof I affix my signature.

SAMUEL CHARLES RYDER.